United States Patent [19]
Felt

[11] Patent Number: 5,359,892
[45] Date of Patent: Nov. 1, 1994

[54] FLOWMETER MEASURING CHAMBER

[76] Inventor: Thomas W. Felt, 905 Hazel Ave., Ukiah, Calif. 95482

[21] Appl. No.: 97,360

[22] Filed: Jul. 26, 1993

[51] Int. Cl.⁵ .......................... G01F 3/08; F16N 13/20
[52] U.S. Cl. ...................................... 73/257; 418/64
[58] Field of Search ................. 73/257, 239, 253, 255; 418/64

[56] References Cited

U.S. PATENT DOCUMENTS

| | | |
|---|---|---|
| 300,625 | 6/1884 | Nash . |
| 300,626 | 6/1884 | Nash . |
| 300,627 | 6/1884 | Nash . |
| 300,628 | 6/1884 | Nash . |
| 300,629 | 6/1884 | Nash . |
| 300,630 | 6/1884 | Nash . |
| 320,577 | 6/1885 | Nash . |
| 320,578 | 6/1885 | Nash . |
| 320,579 | 6/1885 | Nash . |
| 353,703 | 12/1886 | Nash . |
| 449,820 | 4/1891 | Nash . |
| 673,173 | 4/1901 | Nash ..................... 73/257 |
| 1,026,992 | 5/1912 | Monard . |
| 1,081,687 | 12/1913 | McLane ................. 418/64 |
| 1,856,850 | 5/1932 | Marden . |
| 1,961,688 | 6/1934 | Hazard . |
| 1,973,670 | 9/1934 | Star . |
| 1,999,684 | 4/1935 | Bradley . |
| 2,008,500 | 7/1935 | Hazard . |
| 2,016,347 | 10/1935 | Smith, Jr. . |
| 2,399,856 | 5/1946 | Coger ..................... 73/257 |
| 2,406,877 | 9/1946 | Whittaker . |
| 2,462,063 | 2/1949 | Bergman . |
| 2,561,280 | 7/1951 | Kampp . |
| 3,430,537 | 3/1969 | Barber . |

FOREIGN PATENT DOCUMENTS 1002667  3/1983  Russian Federation ............. 418/64

Primary Examiner—Herbert Goldstein
Assistant Examiner—William L. Oen
Attorney, Agent, or Firm—Townsend and Townsend Khourie and Crew

[57] ABSTRACT

A flowmeter measuring chamber having a generally cylindrical outer wall, a generally cylindrical inner wall, and a piston, having a tubular wall disposed between the inner and outer walls and arranged to oscillate within the outer wall, is provided with a mechanism for controlling movement of the tubular wall. That movement is controlled so that a capillary space is maintained between the tubular wall and the inner wall and between the tubular wall and the outer wall at all positions of the piston and contact between the tubular wall and the inner and outer walls is prevented.

24 Claims, 2 Drawing Sheets

FLOWMETER MEASURING CHAMBER

BACKGROUND OF THE INVENTION

The present invention relates to flowmeters generally, and more particularly to measuring chambers for oscillating piston type flowmeters.

A conventional measuring chamber for a flowmeter is shown in FIGS. 1 and 2 in which flow of a fluid through the measuring chamber causes ring piston 2 to oscillate, while the center of the piston is constrained by piston pin 4 and inner cylindrical wall 6 to revolve through a circular orbit concentric with outer cylindrical wall 8 of the chamber. Inner and outer walls 6, 8 define an annular chamber 10 in which the piston revolves and oscillates. Partition wall 12 together with ring piston 2 divides the annular chamber into receiving and discharging spaces. The receiving space is filled by fluid entering inlet port 14, and the fluid is discharged through outlet port 16 at each complete oscillation. In order to permit the piston to move in the desired oscillating path, the side wall 18 of the piston includes slot 20 so that side wall 18 fits over partition 12 against which the side wall bears and forms a seal during oscillation. The piston also includes web 22 which is provided with radial slot 24 in a configuration that permits the necessary pivoting movements of the piston. Opening 25 is the uppermost opening in the row of openings formed through the side wall of the piston along one side of slot 20. Another similar row of openings is formed on the other side of slot 20, but hidden from view. These openings permit some fluid flow between the interior of the piston and the annular chamber such that when the piston moves away from the partition wall, low pressure areas are avoided. The outer cylindrical wall also is provided with a vertical row of openings (not shown) adjacent inlet port 14 for similar reasons. Sealing pin 26 extends from cylindrical wall 6 to form a seal between the piston and partition wall 12.

A take-off mechanism (not shown) for registering the volume of fluid passed through the metering chamber per oscillation of the piston ring is coupled to piston pin 4. Piston pin 4 is centrally positioned in piston web 22 and includes upper portion 4a which is coupled to the take-off mechanism and lower portion 4b which extends below web 22 into annular channel 27 and engages control roller or bushing 28. Control roller 28 is loosely carried by pin or stud 30 which is fixed to bottom head 32 of the measuring chamber. It is known to use brass to make the control roller and the lower portion of the piston pin which contacts the control roller, and to make the fixed stud of hardened steel. When the softer collar wears, it is simply replaced. However, among the drawbacks of these flowmeters is that when the piston revolves at a relatively high velocity, pin 4 tends to move radially outward due to centrifugal forces. This causes the inner and outer side surfaces of piston wall 18 to contact the inner and outer cylindrical walls 6, 8 of the measuring chambers at diametrically opposed positions on the piston as designated by reference numerals 34 and 36, such that undesirable wear of the piston and inner and outer cylindrical walls results. The wear increases the clearance between the piston and inner and outer walls 6, 8, which causes the capillary seal between the piston and inner and outer walls 6, 8 to deteriorate, thereby reducing meter accuracy. It also has been found that at relatively high piston velocities, significant deflection or cupping of piston web 22, piston nutation and vibration occur. It is believed that the cupping and nutation results from the tendency for generally unconstrained portion 4b of pin 4 to deflect perpendicular to the center axis of the pin. In addition to causing the piston to contact and wear the inner and outer cylindrical walls, piston cupping, vibration and nutation cause the piston to displace the capillary seal between the piston and inner and outer cylindrical wall which causes fluid leakage which, in turn, reduces meter accuracy.

SUMMARY OF THE INVENTION

The present invention is directed to a flowmeter measuring chamber that avoids the problems and disadvantages of the prior art. The invention accomplishes this goal by providing a measuring chamber having substantially concentric inner and outer cylindrical walls, and a hollow piston having a tubular wall arranged between and being movable in a plane substantially perpendicular to the inner and outer walls with a mechanism for controlling movement of the tubular piston wall. This mechanism controls piston movement so that a capillary space is maintained between the tubular piston and inner walls and between the tubular piston and outer walls at all positions of the tubular piston wall and contact between the tubular wall of the piston and the inner and outer walls is prevented. The control mechanism also is constructed to minimize undesirable piston movement including cupping, vibration and nutation.

In the preferred embodiment, the control mechanism comprises a control bearing having first and second sockets. A center pin extending along the center axis of the inner and outer walls is rotatably mounted in the first socket, and a piston pin extending centrally of the tubular wall is rotatably mounted in the second socket. As the piston oscillates and the piston pin revolves around the center pin, the control bearing maintains the piston pin at a constant distance relative to the center pin independent of centrifugal and/or centripetal forces. Consequently, the clearance (capillary space) between the tubular piston wall and the inner wall and the tubular piston wall and the outer wall remains fixed.

Another advantage of the control bearing of the present invention is that the piston pin socket is configured to provide lateral support for the piston pin, preferably over substantially the entire circumference of the pin. This prevents lateral pin deflection which could otherwise cause piston wobble or nutation, cupping of the piston web, and piston vibration. In addition to causing contact and wear between the tubular piston wall and the inner and outer cylindrical walls, these effects cause the tubular piston wall to enter the capillary space and directly displace the capillary seal thereby reducing meter accuracy. Thus, in contrast to known measuring chambers, the measuring chamber of the present invention maintains a positive capillary seal between the piston and inner and outer cylindrical wall of the chamber to ensure flow measurement accuracy, even at relatively low or high piston velocities.

Another advantage of the present invention is that the control bearing desensitizes measuring chamber manufacturing tolerances. Machining variations in the piston and surrounding cylindrical walls in conventional measuring chambers generally can cause contact and wear between those elements, as well as vibration, all of which reduce meter accuracy as discussed above. The control bearing of the present invention maintains the piston pin and, thus, the tubular piston wall at a constant distance from the chamber center, thereby eliminating such contact even when the manufacturing tolerances of the piston wall and surrounding cylindrical walls are relaxed. In addition, the control bearing laterally supports the piston pin which further lessens the need for close manufacturing tolerances by minimizing piston vibration that otherwise tends to cause contact between the piston and surrounding cylindrical walls.

In a further embodiment of the control bearing, a mechanism for adjusting the distance between the center axes of the sockets is provided. In this way, the piston clearance for the capillary seal can be adjusted to accommodate variations in machining tolerances and provide optimal performance.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
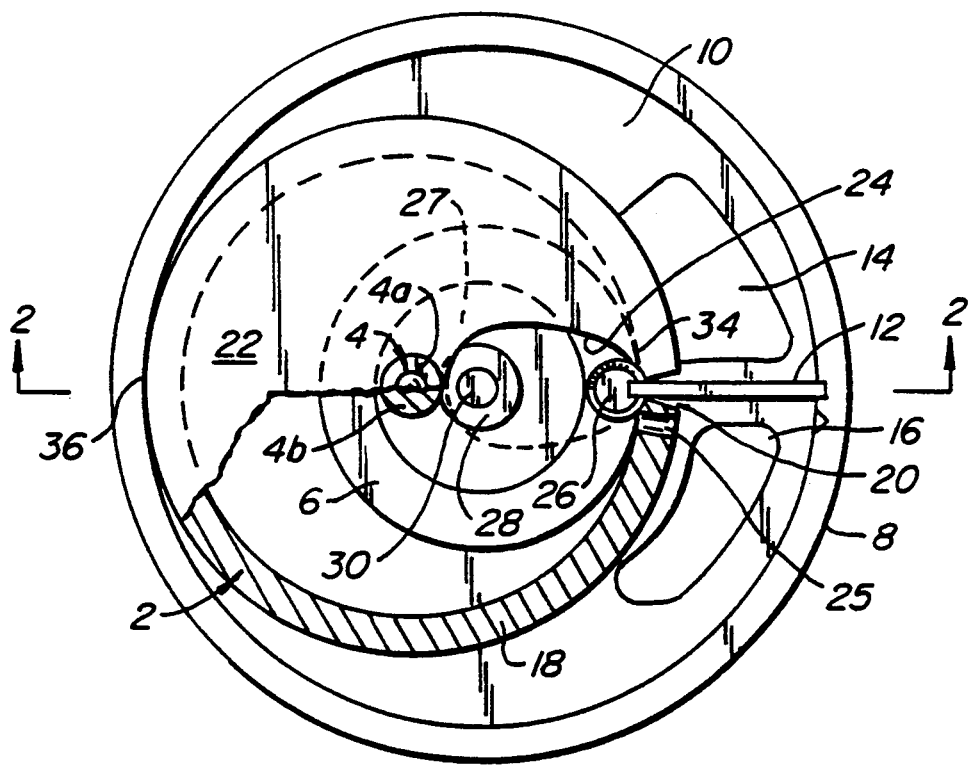
FIG. 1 is a plan view of a conventional measuring chamber shown in partial cross section.
Figure 2:
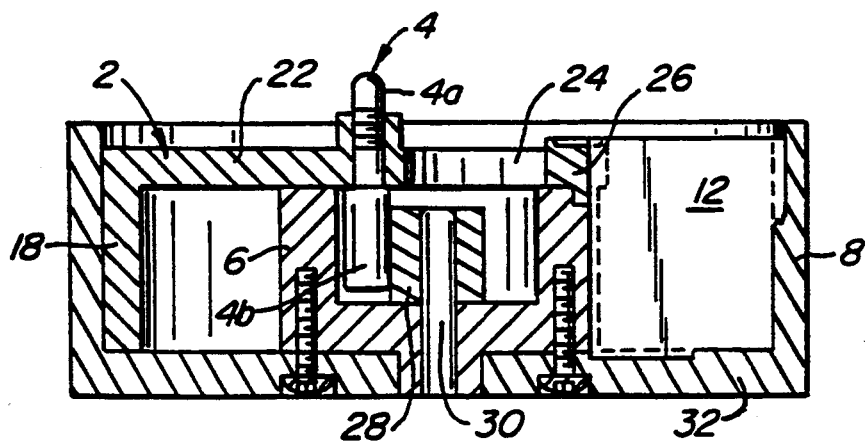
FIG. 2 is a sectional view taken along line 2—2 in FIG. 1.
Figure 3:
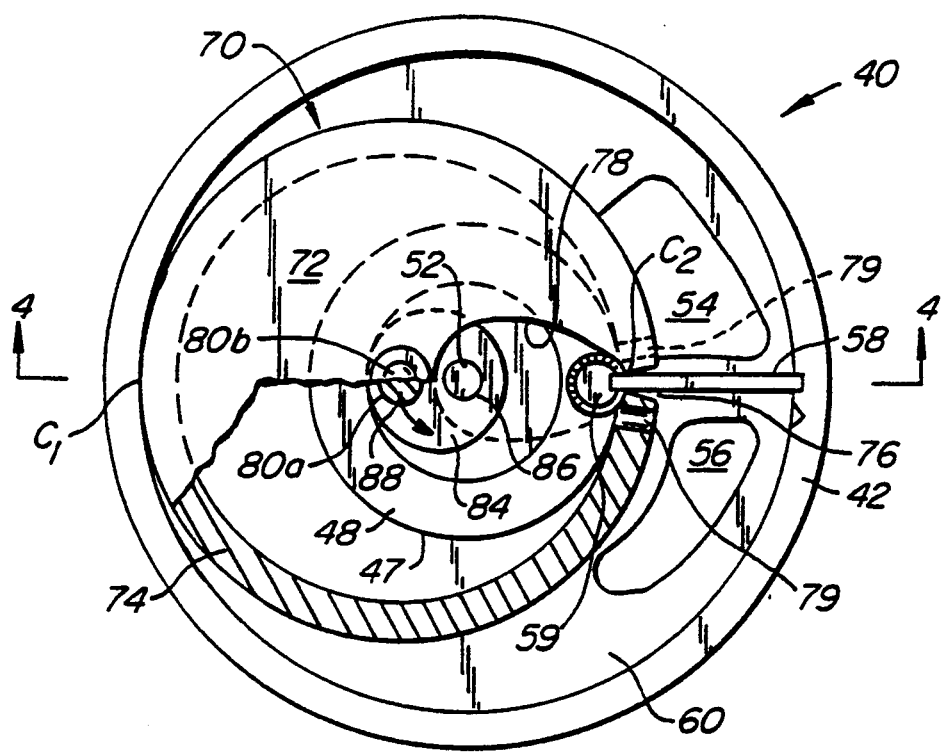
FIG. 3 is a plan view of a measuring chamber in accordance with the principles of the present invention with the piston shown in partial section.
Figure 4:
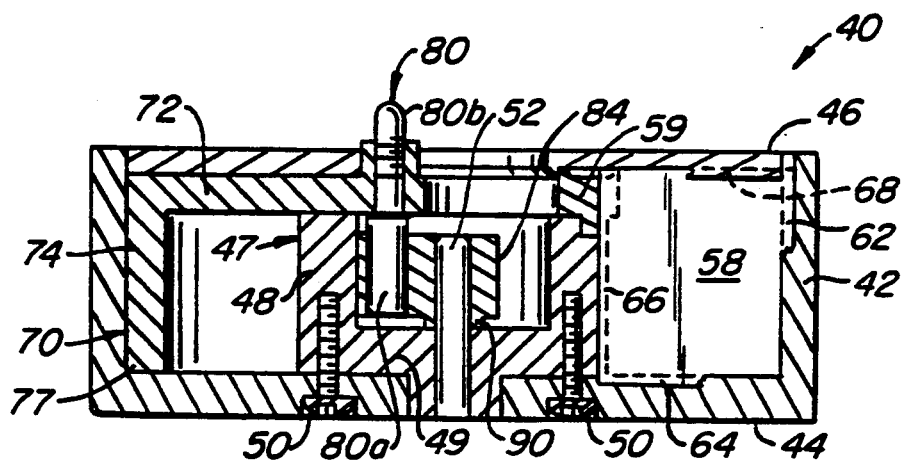
FIG. 4 is a sectional view taken along lines 4—4 in FIG. 3 and further including an upper head member.

Referring to FIGS. 3–5, wherein like numerals indicate like elements, a flowmeter measuring chamber and piston carrier is shown in accordance with the principles of the present invention.

Flowmeter measuring chamber 40 includes cylindrical outer member or wall 42, lower head member 44, which preferably is integrally formed with cylindrical wall 42, and upper head member 46. Cylindrical post or center cup 47 includes inner cylindrical wall or member 48 and is centrally disposed on lower head member 44 such that cylindrical inner wall 48 is concentric with cylindrical outer wall 42. Post 47 is releasably secured to head member 44 by screws 50, for example. Pin or stud 52 is concentrically positioned within cylindrical post 47 and, thus, wall 48 and secured to lower head member 44. Pin 52 preferably is press fit into head member 44. Lower head member 44 is provided with inlet opening 54 and outlet opening 56 for introducing fluid into and discharging fluid from the measuring chamber. A partition plate or wall 58 extends across annular chamber or channel 60 which is formed between inner and outer cylindrical members 48, 42 and between head members 44, 46. Partition plate 58 closely fits in grooves 62, 64, 66 and 68 provided in the inner wall surface of cylindrical member 42, lower head member 44, the outer wall surface of cylindrical member 48, and the bottom of upper head member 46.

Hollow ring piston 70 includes a transversely extending web or head portion 72 and a tubular side wall 74 that extends from web portion 72 into annular chamber 60. Tubular wall 74 of ring piston 70 includes a slot 76 so that wall 74 fits over partition wall 58 against which it bears as piston 70 oscillates in a plane substantially perpendicular to inner and outer members 48, 42. Slot 76 preferably is formed with outwardly tapering sides constituting bearing surfaces adapted to bear against partition plate 58. Slot 76 continues to enlarged radial slot 78 formed in web portion 72. Slot 78 permits the desired angular movements of the piston in the course of its oscillations with respect to the partition 58 and sealing pin 59. Sealing pin 59 extends from cylindrical wall 18 to form a seal between the piston and partition plate 58.

The inner side of bottom head member 44 within annular chamber 60 constitutes a bearing face for the open end 77 of tubular wall 74 opposite web portion 72. Similary, the inner side of upper head member 46 provides a bearing face for engaging the upper side of web portion 72, while the upper surface of center cup 47 provides a bearing and sealing surface beEween the center cup and the inner surface of piston web portion 72.

Openings 79 also are provided on both sides of slut 76 through piston side wall 74, and preferably are aligned in vertical rows, as is conventional in the art, to permit some fluid flow between the interior of the piston and the annular chamber to break any vacuum that might be created during operation, for example, when the piston moves away from the outer cylindrical wall at the partition wall location. The outer cylindrical wall also is provided with a similar row of openings which also serve to break any vacuum which might be created during oscillation of piston 70 as is conventional in the art. For the same reasons, vertical recesses (not shown) also can be provided in the inner surface of the outer cylindrical wall adjacent the partition plate as is conventional.

Pin 80 is secured in the central portion of ring piston web 72 and arranged to extend axially thereof along the center axis of tubular wall 74. Pin 80 has an enlarged lower end portion 80a and an upper end portion 80b adapted to engage a conventional power take-off mechanism (not shown).

According to the present invention, flowmeter measuring chamber 40 is provided with a piston carrier. In the preferred embodiment, two axis revolving control bearing or bushing 84 carries piston 70 along a predetermined path. Control bearing 84 includes first and second holes or sockets 86 and 88 which have parallel center axes in the illustrated embodiment. First socket 86 receives post pin or stud 52 and a second hole or socket 88 receives the lower end portion 80b of piston pin 80. That is pins 52 and 80 are rotatably mounted in sockets 86 and 88. With this construction, the two axis revolving control bearing maintains piston pin 80 in a uniform and constant orbit about post pin or stud 52 independent of centrifugal forces. The distance between the center axes of the socket pair is selected to maintain a capillary space $C_1$ between the inner wall surface of outer cylindrical member 42 and the outer wall surface of tubular piston wall 74, and a capillary space $C_2$ between the inner wall surface of the tubular piston wall 74 and the outer wall surface of inner cylindrical member 48 such that a positive capillary seal (formed by the working fluid, i.e., the fluid being metered) is maintained between the piston and outer member 42 and between the piston and inner member 48. The bearing sockets also are positioned such that $C_1$ and $C_2$ which are diametrically opposed about tubular wall 74, have essentially the same dimension which preferably is about 0.001–0.002 inch depending on the size of the measuring chamber and the fluid being metered as would be apparent to one of ordinary skill. It should be understood from the forgoing description that the control bearing also maintains capillary space or clearance $C_1$, $C_2$ constant.

Control bearing 84 is further provided with an annular lip 90 which minimizes the contact surface and, thus, friction between the control bearing and base 49 of cylindrical post 47 (FIG. 4). Bearing 84 also is dimensioned such that it remains spaced from inner cylindrical member 48 at all of its positions of bearing 84 to prevent undesirable contact between bearing 84 and member 48. In addition, pins 52 and 80 preferably are of substantially harder material than control bearing 84 or the portions of the bearing that form sockets 86 and 88. In this way, pin dimensions remain constant, so that bearing replacement is simple. The clearance between pins 52 and 80 and their respective bearing wall defining either socket 86 or 88 preferably is about 0.0002–0.0005 inch.

Although the control bearing is shown as having a circular configuration, it should be understood that other shapes (e.g., elliptical, polygonal, etc.) can be used, as would be apparent to one of ordinary skill in the art. Other socket configurations that laterally support piston pin 80 so that pin deflection perpendicular to the central axis of the pin (lateral deflection) is prevented also can be used.

In operation, fluid is introduced into the measuring chamber through inlet port 54. Depending on the position of piston 74, that fluid generates pressure against either or both (1) the outer portion of tubular piston wall 74 that is between the capillary seal formed at capillary space $C_1$ and the side of partition wall 58 adjacent inlet 54 and (2) the inner portion of tubular piston wall 74 that is between the capillary seal formed at capillary space $C_2$ and the side of partition wall 58 adjacent inlet 54. Specifically, at the 12 o'clock position the pressure essentially is against the inner portion, while the pressure essentially is against the outer portion at the 6 o'clock position (FIG. 3). Between the 12 o'clock and 6 o'clock positions, both the inner and outer portions of the tubular piston wall are under pressure. The resultant movement of piston 74 is described below.

Under pressure of fluid entering inlet port 54 described above, the center of ring piston 70 moves in a counter-clockwise direction about center pin 52. As the piston continues to revolve about pin 52 and move beyond the 6 o'clock position shown in FIG. 3 toward the 12 o'clock position, the piston slides along partition wall 58, toward the juncture of partition 58 and outer cylindrical member 42. Throughout each oscillation fluid is introduced and discharged through inlet and outlet ports 54 and 56 as is evident from the drawings and conventional in the art. In sum, as fluid flows through the measuring chamber, piston 70 oscillates along partition wall 58, while the center of piston 70 is constrained by piston pin 80 and control bearing socket 88 to revolve through a circular orbit concentric with outer cylindrical wall 42 of the chamber. The volume of fluid passed by the measuring chamber for each complete oscillation of the piston is registered by a registering mechanism through a suitable actuator which is operated by the movement of the upper portion 80b of the piston pin. Each capillary space $C_1$, $C_2$ moves as piston 74 revolves around pin 52 and effectively prevents fluid flow past the space through the formation of a capillary seal such that essentially all of the fluid that enters inlet port 54 moves with piston 74 before being discharged through outlet port 56 so that the registered movement of piston 74 represents accurate measurement of the flow rate through measuring chamber 40.

As control bearing 84 controls the orbit of the center of the piston about center pin 52, bearing 84 controls the position of tubular wall 74 of the piston such that a capillary space ($C_1$, $C_2$) is maintained between the tubular piston wall and outer member 42 and between the tubular wall and inner member 48. In this way, a positive and constant capillary seal is maintained so that effectively no fluid bypasses the interface between the tubular wall 74 and inner and outer members 48, 42 during use resulting in high meter accuracy. At the same time, undesirable contact between the piston and the inner and outer cylindrical members of the measuring chamber is prevented.

Figure 5A:
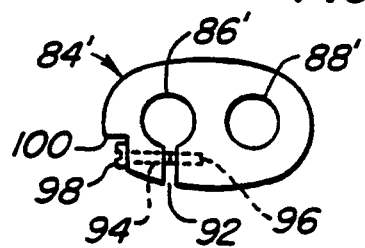
FIGS. 5A and B are top plan views of further embodiments of the two axis revolving control bearing illustrated in FIGS. 3 and 4.
Figure 5B:
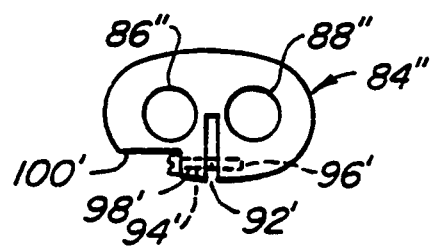

Referring to FIGS. 5A and B, further embodiments of the two axis revolving control bearing are shown. In each embodiment, the distance between the center axes of the sockets is made adjustable so that the capillary space or clearance between the piston and the inner and outer cylindrical walls 48, 42 can be adjusted. A preferred slot-screw type adjustment mechanism is as illustrated in FIGS. 5A and B. Referring to FIG. 5A, two axis control bearing 84' includes slot 92 that extends from hole 86' through the entire thickness of the bearing and to the outer periphery of the bearing. As in control bearing 84, sockets 86' and 88' are configured to rotatably receive pins 52 and 80. Bearing 84' also includes bore 94 that intersects slot 92. Bore 94 includes threaded portion 96 for cooperating with threaded screw 98. Slot 92 is dimensioned such that when the head of screw 98 contacts the seat of cut-out 100, further rotation of the screw causes the width of the slot to decrease and, thus, the center axis of hole 86' to move toward hole 88', thereby reducing the distance between the substantially parallel center axes of these holes. Referring to FIG. 5B, slot 92' is arranged such that it extends from the outer perimeter of control bearing 84'', to a region between substantially parallel sockets or holes 86'', 88'' which are configured to rotatably receive pins 52 and 80. The adjusting screw 98' is turned in bore 94', 96' to change the width of slot 92' in the same way as described above such that the distance between the center axes of holes 86'', 88'' can be changed. Thus, when the screw head of screw 98' is seated against cut-out 100', as shown in FIG. 5B, and is further turned-in, the width of slot 92' and the distance between the center axes of holes 86'', 88'' is reduced.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A flowmeter measuring chamber comprising;
   a first wall having a generally cylindrical inner surface;

a second wall having a generally cylindrical outer surface facing and being substantially concentric with said inner surface;

a hollow piston having a tubular wall disposed between and being movable in a plane substantially perpendicular to the inner and outer surfaces of said first and second walls, said tubular wall having an interior and exterior surface; and means for controlling movement of said tubular wall so that a capillary space, which effectively prevents fluid flow thereby when a fluid seal is formed therein, is maintained between said tubular wall exterior surface and first wall inner surface and between said tubular wall interior surface and second wall outer surface at all positions of said tubular wall and contact between said tubular wall and said inner and outer surfaces is prevented.

2. The measuring chamber of claim 1 including an end wall arranged at one end of said tubular wall and a Din extending from said end wall substantially along the center axis of said tubular wall, said controlling means including a control member having a socket, said pin being disposed in said socket.

3. The measuring chamber of claim 2 including a head member associated with said first wall and positioned beneath said piston and a second pin extending from said head member and being substantially concentric with said generally cylindrical inner and outer surfaces, said control member including a second socket, said second pin being disposed in said second socket.

4. The measuring chamber of claim 1 wherein said inner and outer surfaces form a substantially annular channel therebetween, said measuring chamber further including a head member associated with said first wall and positioned beneath said piston, said head member including an inlet port and an outlet port for permitting fluid to be introduced into and discharged from said annular channel.

5. A flowmeter measuring chamber comprising:
a generally cylindrical outer wall;
a first pin disposed within said outer wall;
a piston having a tubular wall disposed within said outer wall;
a second pin extending from said piston; and
a control member having first and second sockets, said first pin being disposed in said first socket and said second pin being disposed in said second socket, said sockets being positioned such that a capillary space is maintained between said tubular and outer walls and contact between said tubular and outer walls is prevented.

6. The measuring chamber of claim 5 further including a generally cylindrical inner wall, said tubular piston wall being arranged between said inner and outer walls and being movable parallel to a plane extending between said inner and outer walls, said sockets being positioned such that a capillary space is maintained between said tubular and inner walls at all positions of said tubular wall and contact between said tubular and inner walls is prevented at all positions of said tubular wall.

7. The measuring chamber of claim 5 wherein said control member in spaced from said inner wall at all positions of said control member.

8. The measuring chamber of claim 5 further including a head member at an end of said cylindrical outer wall, said head member having an inlet opening and an outlet opening.

9. The measuring chamber of claim 8 further including a generally cylindrical inner wall, said tubular piston wall extending between said inner and outer walls, and being movable in a plane that extends between said inner and outer walls, said sockets being positioned such that a capillary space also is maintained between said tubular and inner walls and contact between said tubular and inner walls is prevented at all positions of said tubular wall.

10. The measuring chamber of claim 9 further including a partition wall extending between said openings and between said inner and outer walls.

11. The measuring chamber of claim 5 wherein the center lines of said sockets are substantially parallel and configured to prevent said pins from moving toward or away from one another.

12. The measuring chamber of claim 5 further including means for adjusting the distance between said sockets.

13. The measuring chamber of claim 5 wherein said control member includes a slot that extends from one of said sockets toward the periphery of said control member.

14. The measuring chamber of claim 5 wherein said control member includes a slot that extends between said sockets.

15. The measuring chamber of claim 5 wherein said first and second pins are substantially harder than the portions of said control member that form said sockets.

16. A flowmeter measuring chamber comprising:
a first generally cylindrical member having a generally cylindrical inner surface;
a second generally cylindrical member having a generally cylindrical outer surface that faces and is substantially concentric with said inner surface, said inner and outer surfaces forming a substantially annular channel therebetween;
a hollow piston having an end portion and a tubular portion extending from said end portion, said tubular portion being disposed between and being movable in a plane substantially perpendicular to the inner and outer surfaces of said first and second members, said tubular portion having an interior and exterior generally cylindrical surface;
a head member from which said first member extends, said head member including an inlet port and an outlet port that are in fluid communication with said annular channel for introducing and discharging fluid into and from said channel;
a partition wall extending between said ports and between said inner and outer surfaces;
a first pin extending from the end portion of said piston;
a second pin extending from said head member and being substantially concentric with said inner and outer surfaces; and
a control member having first and second sockets said first pin being disposed in said first socket and said second pin being disposed in said second socket, said sockets being positioned such that said pins maintain a capillary space between the exterior surface of said tubular portion and said first member inner surface and between the interior surface of said tubular portion and said second member outer surface and prevents contact between said exterior and inner surfaces and between said interior and outer surfaces.

17. The measuring chamber of claim 16 wherein the distance between said pins is fixed so that the dimension of said capillary spaces remains constant.

18. The measuring chamber of claim 17 wherein said first socket supports said first pin laterally over substantially the entire circumference thereof to prevent lateral deflection of said first pin.

19. The measuring chamber of claim 16 wherein one of said sockets supports a respective pin laterally over substantially the entire circumference thereof to prevent lateral deflection of said respective pin.

20. A flowmeter measuring chamber comprising:
a generally cylindrical outer wall;
a first pin fixedly positioned within said outer wall;
a piston having a tubular wall disposed within said outer wall;
a second pin extending from said piston; and
a control member having first and second sockets, said first pin being disposed in said first socket and said second pin being disposed in said second socket, said sockets being configured such that the center axes of said pins are maintained substantially parallel.

21. The measuring chamber of claim 20 wherein said sockets are positioned such that a capillary space is maintained between said tubular and outer walls and contact between said tubular and outer walls is prevented.

22. The measuring chamber of claim 21 wherein the distance between said pins is fixed so that the dimension of said capillary space remains constant.

23. The measuring chamber of claim 22 wherein said second socket supports said second pin laterally over substantially the entire circumference thereof to prevent lateral deflection of said second pin.

24. The measuring chamber of claim 20 wherein one of said sockets supports a respective pin laterally over substantially the entire circumference thereof to prevent lateral deflection of said respective pin.

* * * * *